(12) United States Patent
Yabe

(10) Patent No.: US 6,555,980 B2
(45) Date of Patent: Apr. 29, 2003

(54) WIPER CONTROL APPARATUS

(75) Inventor: Hiroo Yabe, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/910,839

(22) Filed: Jul. 24, 2001

(65) Prior Publication Data

US 2002/0008486 A1 Jan. 24, 2002

(30) Foreign Application Priority Data

Jul. 24, 2000 (JP) .......................... 2000-222689

(51) Int. Cl.$^7$ .............. H02P 1/04; H02P 5/00; H02P 7/00
(52) U.S. Cl. .......................... 318/443; 15/250
(58) Field of Search ............... 318/443–445, 318/280, 483, DIG. 2; 15/250, 250.17

(56) References Cited

U.S. PATENT DOCUMENTS

| | | | |
|---|---|---|---|
| 5,525,878 A | * 6/1996 | Buchanan et al. | 318/443 |
| 5,694,011 A | * 12/1997 | Corey et al. | 318/280 |
| 6,023,107 A | * 2/2000 | Grass | 15/250.16 |
| 6,400,110 B1 | * 6/2002 | Yabe et al. | 318/443 |

FOREIGN PATENT DOCUMENTS

JP 9-193748 7/1997

\* cited by examiner

*Primary Examiner*—Jeffrey Donels
(74) *Attorney, Agent, or Firm*—Armstrong, Westerman & Hattori, LLP

(57) ABSTRACT

A wiper control apparatus includes a combination switch 2, a wiper motor 7, an autostop (AS) switch 8, a first semiconductor switch element 4 for on/off controlling energization of the wiper motor, a second semiconductor switch element 5 for turning on a closed circuit which passes a reverse current through the wiper motor 7 while the energization for the wiper motor 7 is off, a controller for ON/OFF controlling the first and the second semiconductor switch element, a current detecting resistor RS1 for current flowing through the second semiconductor switch 5, and a current limiting circuit A for limiting the current flowing the second semiconductor switch element 5 when the current detected by the current detecting means RS1 exceeds a prescribed threshold value. In this configuration, a wiper control apparatus can be provided which can solve the problem when the abnormality of short-circuiting downstream of the wiper motor occurs, is compact, reliable and surely operable using semiconductor switches and a digital-controlled controller.

5 Claims, 13 Drawing Sheets

WIPER CONTROL APPARATUS

BACKGROUND OF THE INVENTION

1. Field of the Invention

The present invention relates to a wiper control apparatus using a semiconductor switching element such as a MOSFET.

2. Description of the Prior Art

One of previously known wiper control apparatus is disclosed in JP-A-9-193748. In this wiper control apparatus, as seen from FIG. 13, when a combination switch 17 is set at an intermittent mode (INT), a driving circuit 20 turns on an interruption switch MOSFET 19 to start a motor 15 so that a wiper reciprocates once. Then, the terminals P and Q of a wiper switch 16 are connected to each other. Then, the driving circuit 20 turns off the interruption switch 19 to interrupt the power supply to the motor 15. When the terminals P and Q of the wiper switch 16 are connected, a battery-voltage side terminal K and a ground side terminal J are connected to each other through a contact terminal T1 and braking resistor 18 so that the motor 15 is braked. Thus, the wiper stops quickly.

However, the wiper control apparatus presents the following problems.

(1) When the wiper motor 15 generates an abnormal current as if it is locked, a large current continues to flow through a MOSFET 19 or resistor 18. Therefore, the resistor 18 or MOSFET 19 may be excessively heated and burned. In order to avoid the burning, a countermeasure for setting a large current rating for the resistor 18 and MOSFET 19 and providing a radiator is required. This upsizes the apparatus and makes it expensive.

(2) When the plus terminal and minus terminal of a battery 11 are erroneously connected inversely, a large current continues to flow through the parasitic diode of the MOSFET 19 and the resistor 18. Therefore, the resistor 18 and the MOSFET may be burned.

(3) For some time after the MOSFET 19 turns on, since the terminals P and Q of the wiper switch 16 remain connected, a tunneling current will flow through a passage of wiper switch 16→resistor 18→MOSFET 19 from the battery 11. This leads to unnecessary dissipation of heat and noise.

(4) Setting the intermittent time and the after-wash wiping operation time after the washer has been operated is carried out in an analog manner using the charging/discharging theory of a capacitor. This leads to a large change in these times.

In order to solve the problems (1) to (4) of the above wiper control apparatus, JP-A-2000-335374 proposed a wiper control apparatus which is compact, reliable and surely operable using a semiconductor switch and a digital controller.

In the proposed wiper control apparatus, also when the abnormality of the wiring downstream of the wiper motor 15 being short-circuited to a chassis (ground)occurs, a large current continues to flow through the resistor 18 so that the resistor may be excessively heated and burned.

Now it is assumed that short-circuiting of the wiring to the chassis (ground) has occurred between the ground side terminal J and the combination switch 17. In this case, a current flows via the battery-voltage side terminal K of ground side terminal J of the wiper motor 15 and the short-circuited point so that the wiper motor 15 rotates.

On the other hand, the contact P of the wiper switch 16 is periodically changed between the contact points Q and R. While the contact P is being in contact with the contact Q (about 0.1 sec), a large current flows via the contact P, resistor 18, combination switch 17 and short-circuited point. This also occurs between the combination switch 17 and the switch device 19 and between the combination switch 17 and the resistor 18.

At this time, since the current is limited by the resistor 18 having a resistance of 2–4Ω (if the voltage of the battery 11 is 12 V, the current is 5 V at the maximum) , the fuse will not be broken. As a result, the current continues to flow through the resistor 18 so that it may be excessively heated and burned. In order to avoid the burning, the countermeasure of providing a radiator with the current rating of the resistor 18 being increased is required. This increases the scale of the apparatus and the production cost thereof.

FIG. 15 shows timing charts of signals in an ignition switch (IG) of a wiper control apparatus 12, a motor AS switch 16, wiper motor 16 and brake resistor 18, as shown in FIG. 12. As seen from FIG. 15, when abnormality of short-circuiting occurs downstream of the wiper motor 15, a current continues to flow through the wiper motor 15 so that the contact point of the motor AS switch 16 is periodically changed between the high side and low side. Correspondingly, the current continues to flow through the braking resistor 18.

SUMMARY OF THE INVENTION

An object of the present invention is to improve the wiper control apparatus proposed in JP-A-2000-335374 and to solve the problem when abnormality of the wiring downstream of a wiper motor being short-circuited occurs in the conventional wiper control apparatus to provide a wiper control apparatus which is compact, reliable and surely operable using a semiconductor switch and a digital controller.

In order to attain the above object, in accordance with the first aspect of the present invention, there is provided a wiper control apparatus comprising:

a combination switch for setting an operation mode of a wiper;

a wiper motor which is driven according to the operation mode set by the combination switch;

an autostop (AS) switch for producing a signal having a level varying according to a park position and other positions as the wiper motor rotates;

a first semiconductor switch element for on/off controlling energization of the wiper motor;

a second semiconductor switch element for turning on a closed circuit for braking the wiper motor by passing a reverse current through the wiper motor while energization for the wiper motor is off;

a controller for supplying a first ON/OFF control signal to the first semiconductor switch element and a second ON/OFF control signal to the second semiconductor switch element;

current detecting means for detecting a current flowing through the second semiconductor switch; and current limiting means for limiting a current flowing through the second semiconductor switch element if the current detected by the current detecting means exceeds a prescribed threshold value.

In this configuration, since an abnormal current is limited when abnormality of short-circuiting occurs downstream of the wiper motor, the safety of the wiper control apparatus can be improved. Since heat generation can be reduced when the apparatus is in a normal operation and abnormality of short-circuiting occurs, the wiper control apparatus can be downsized.

Preferably, the current limiting means interrupts the second ON/OFF control signal the current limiting means interrupts the second. ON/OFF control signal when the number of limiting the current reaches a prescribed number of times.

In this configuration, when the number of limiting the current reaches a prescribed number of times, the closed circuit for braking can be surely interrupted so that the safety of the wiper control apparatus can be improved.

Preferably, the first semiconductor switch element is an N-channel MOSFET, and the second semiconductor switch element is a P-channel MOSFET.

In this configuration, the wiper control apparatus can be downsized and manufactured at low cost.

Preferably, a Zener diode is connected to the semiconductor switch element.

In this configuration, inverted electromotive force when the first semiconductor switch is excessively heated and cut off and interrupted is dissipated. The first semiconductor switch can be protected when a battery is erroneously connected in a reverse direction. The second semiconductor switch element can be surely turned off in a manner of shifting the electric potential of its gate electrode.

Preferably, the first semiconductor switch element is located downstream or upstream of the wiper motor.

Where the first semiconductor switch element is arranged upstream, it is protected from malfunction such as short-circuiting so that the safety for the apparatus is improved.

Preferably, the wiper control apparatus according to any one of the first to fifth aspects can be employed together with a relay-type wiper control apparatus, and the controller controls the operation of both wiper control apparatus and relay-type control apparatus.

In this configuration, the controller includes the collected function of controlling both the semiconductor switch(s) and relay, and hence down-sized and made inexpensive. The control is correlated between the front wiper and rear wiper.

The above and other objects and features of the present invention will be more apparent from the following description taken in conjunction with the accompanying drawings.

DESCRIPTION OF THE PREFERRED EMBODIMENTS

Figure 1:
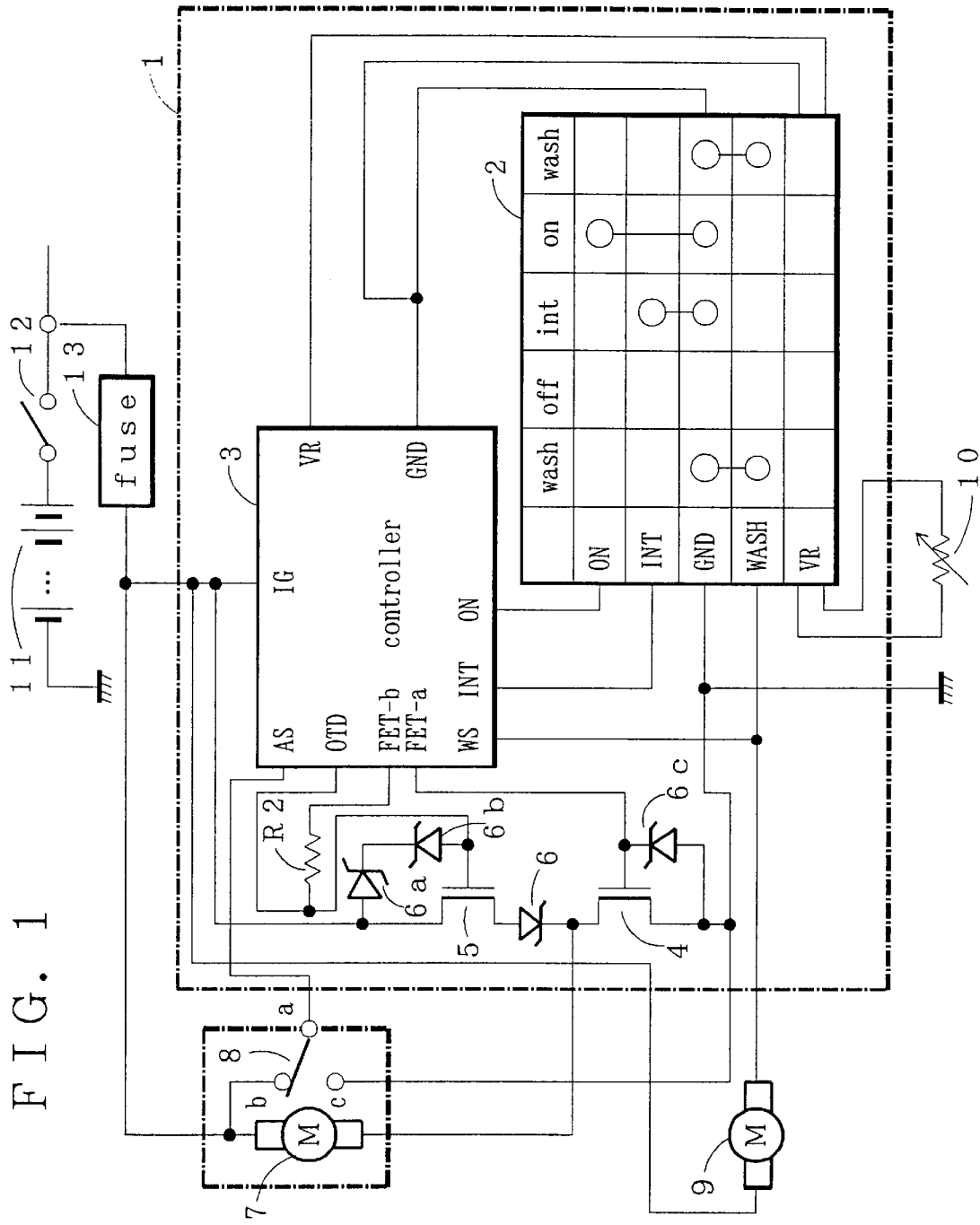
FIG. 1 is a block diagram showing an embodiment of the wiper control apparatus according to the present invention.

Now referring to the drawings, an explanation will be given of several embodiments of a wiper control apparatus according to the present invention.

FIG. 1 is a block diagram of an embodiment of the wiper control apparatus according to the present invention. The wiper control apparatus includes a control unit, generally 1, a wiper motor 7, an AS (autostop) switch 8 and a washer motor 9. The control unit 1 includes a combination switch 2, a controller 3, MOSFETs 4, 5 and Zener diodes 6, 6a, 6b, 6c.

The combination switch 2 serves to set various operation modes of a wiper by an operation by a vehicle driver. The combination switch 2 permits the operation modes of the wiper, i.e. an OFF (stopping) mode., INT (intermittent operation) mode, ON (continuous operation) and WASH (washing) mode to be made through a combination of connection of an ON terminal, an INT terminal, GND terminal and a WASH terminal. The combination switch 2 also includes a VR terminal for connecting a variable resistor 10 for setting an intermittent time.

Figure 2:
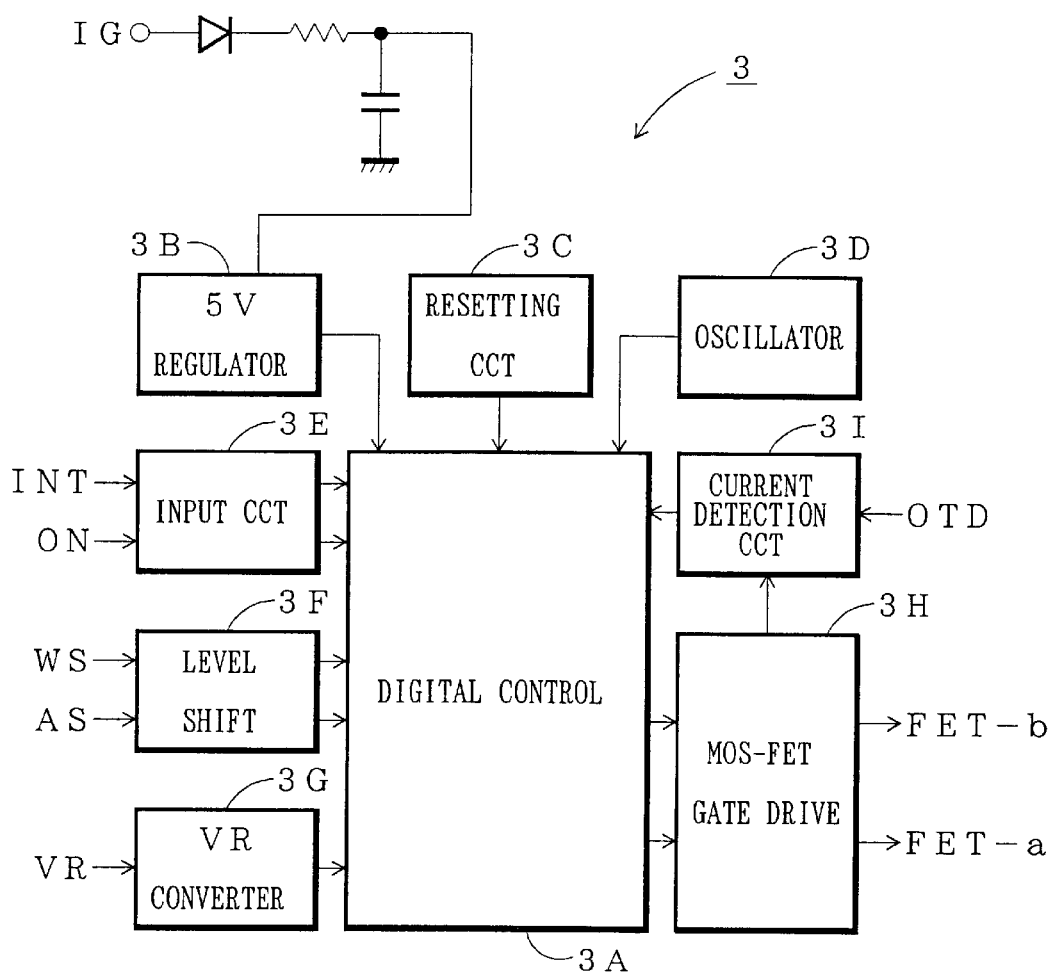
FIG. 2 is a block diagram of a typical configuration of the controller in a wiper control apparatus of FIG. 1.

The controller 3, whose typical configuration is shown in FIG. 2, includes a digital control unit 3A, a 5 V regulator 3B, a reset circuit 3C, an oscillation circuit 3D, an input circuit 3E, a level shift circuit 3F and a VR conversion circuit 3G, an MOSFET gate drive 3H and a current detecting circuit 3J.

The digital control unit 3A, which is constructed of e.g. a microcomputer, serves to control the entire operation of the wiper control apparatus.

The 5 V regulator 3B, to which a battery power supply voltage (e.g. 13.5 V) is supplied through an IG (ignition) switch 12 and a fuse 13 from a battery 11 which is a power source for a vehicle, serves to supply a driving voltage, e.g. 5 V for the digital control unit 3A.

The reset circuit 3C, when the power for the wiper control apparatus is turned on by turn-on of the IG switch 12, serve to reset the operation of the digital control unit 3A.

The oscillation circuit 3D serves to generate and supply a clock signal for the digital control unit 3A.

The input circuit 3E serves to detect the on/off of each of the INT terminal and ON terminal of the combination switch 2 and supply an INT mode ON signal and an ON mode ON signal to the digital control unit 3A.

The level shift circuit 3F converts the battery power supply voltage (13.5 V), detected at the WASH terminal of the combination switch 2 and the common terminal of the AS switch, into 5 V to be supplied to the digital control unit 3A.

Figure 12:
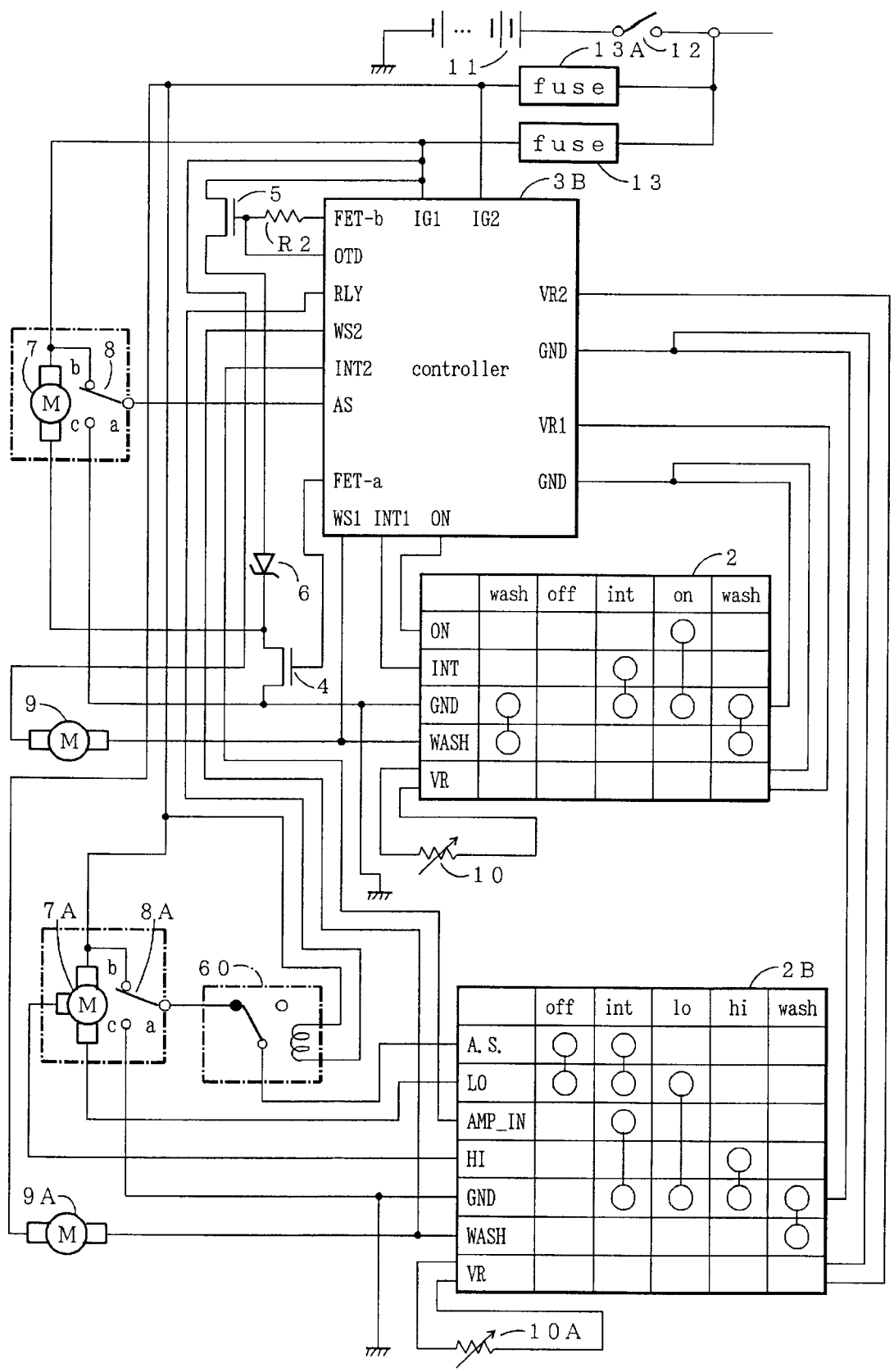
FIG. 12 a block diagram showing still another embodiment of a wiper control apparatus according to the present invention, i.e. a combination with a relay wiper control apparatus.
Figure 14:
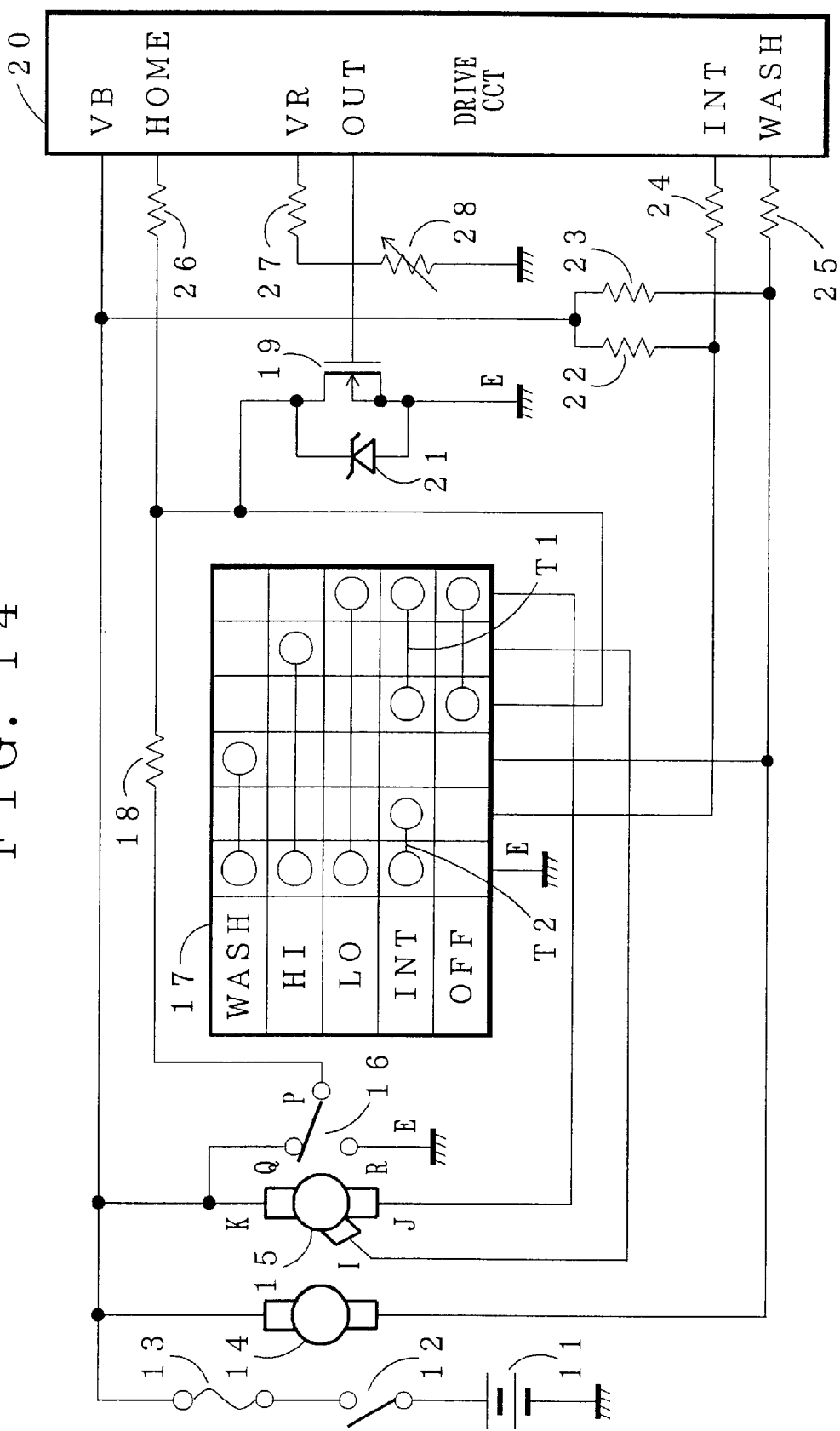
FIG. 14 is a circuit diagram showing the configuration of a conventional wiper control apparatus.
Figure 15:
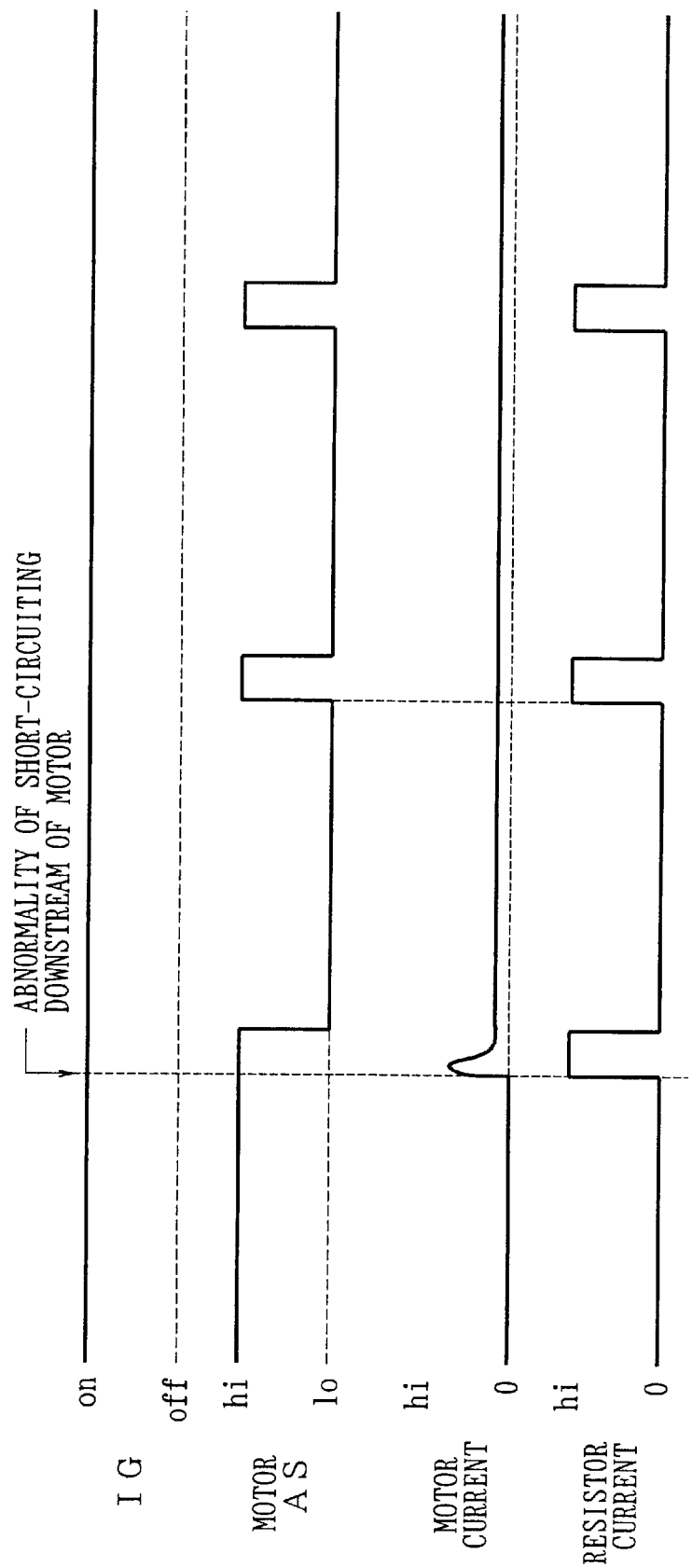
FIG. 15 is timing charts of the respective parts in the wiper control apparatus shown in FIG. 14.

The VR conversion circuit 3G is connected to the VR terminal of the combination switch 2, and serves to set the intermittent time during the INT mode. A typical configuration of the VR conversion circuit 3G is shown in FIG. 12.

The MOSFET gate drive 3H converts the digital output for controlling the MOSFET produced from the digital control unit 3A into an MOSFET operation level voltage which is outputted at control output terminals FET-a and FET-b.

The current detecting circuit 3J constitutes a part of an overheating interruption detecting/latching circuit 30A for performing the protection operation which will be described later and receives the voltage drop across an overheating interruption detecting resistor R2, which serves as overheating interruption detecting means, from an input terminal OTD and supplies a detected signal to the digital control unit 3A.

Figure 3:
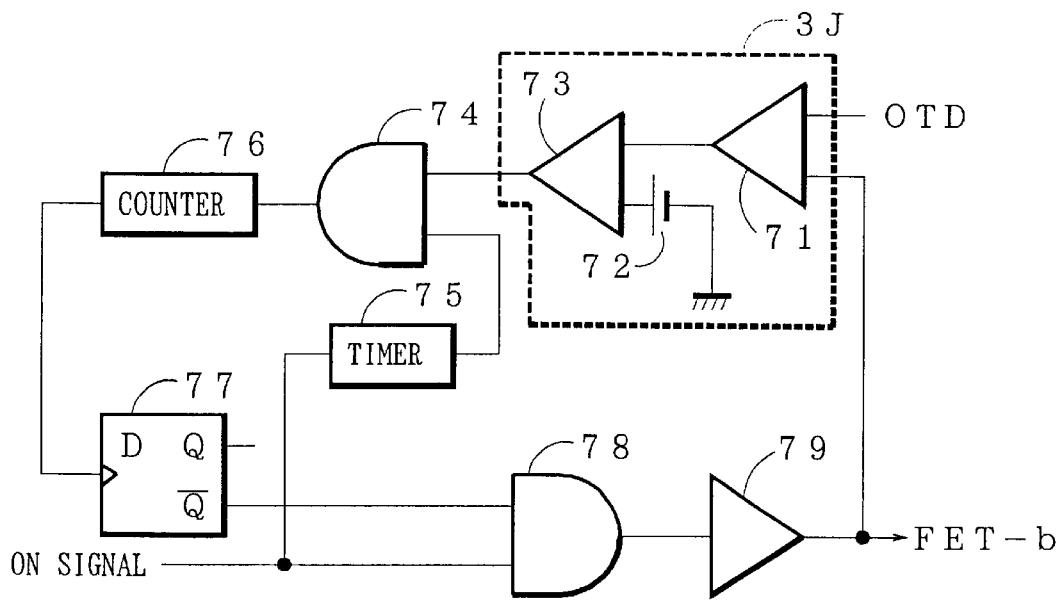
FIG. 3 is a circuit diagram of detecting/latching overheating interruption in the wiper control apparatus shown in FIG. 1.

FIG. 3 is a circuit diagram showing a typical configuration nD of the overheating interruption detecting/latching circuit 30A. As seen from FIG. 3, the overheating interruption detecting/latching circuit 30A includes the current detecting circuit 3J; an AND gate 74, a timer 75, a counter 76, a D flip-flop 77 and an AND gate 78, which are which are a part of the digital control section 3A; and amplifier 78 which is apart of an MOS-FET gate drive 3H. The current detecting circuit 3J includes an operational amplifier 71, a reference voltage source 72 and a comparator 73. In operation of the current detecting circuit 3J, the operational amplifier 71 is supplied with a detected signal of the overheating interruption detecting resistor R2 from the FET-b terminal and OTD terminal. The comparator 73 compares the amplified voltage of the operational amplifier 71 with a voltage from the reference voltage source 72. AN ON signal from the ON terminal of the combination switch 2 is supplied to the one input of the AND gate 78.

Figure 7:
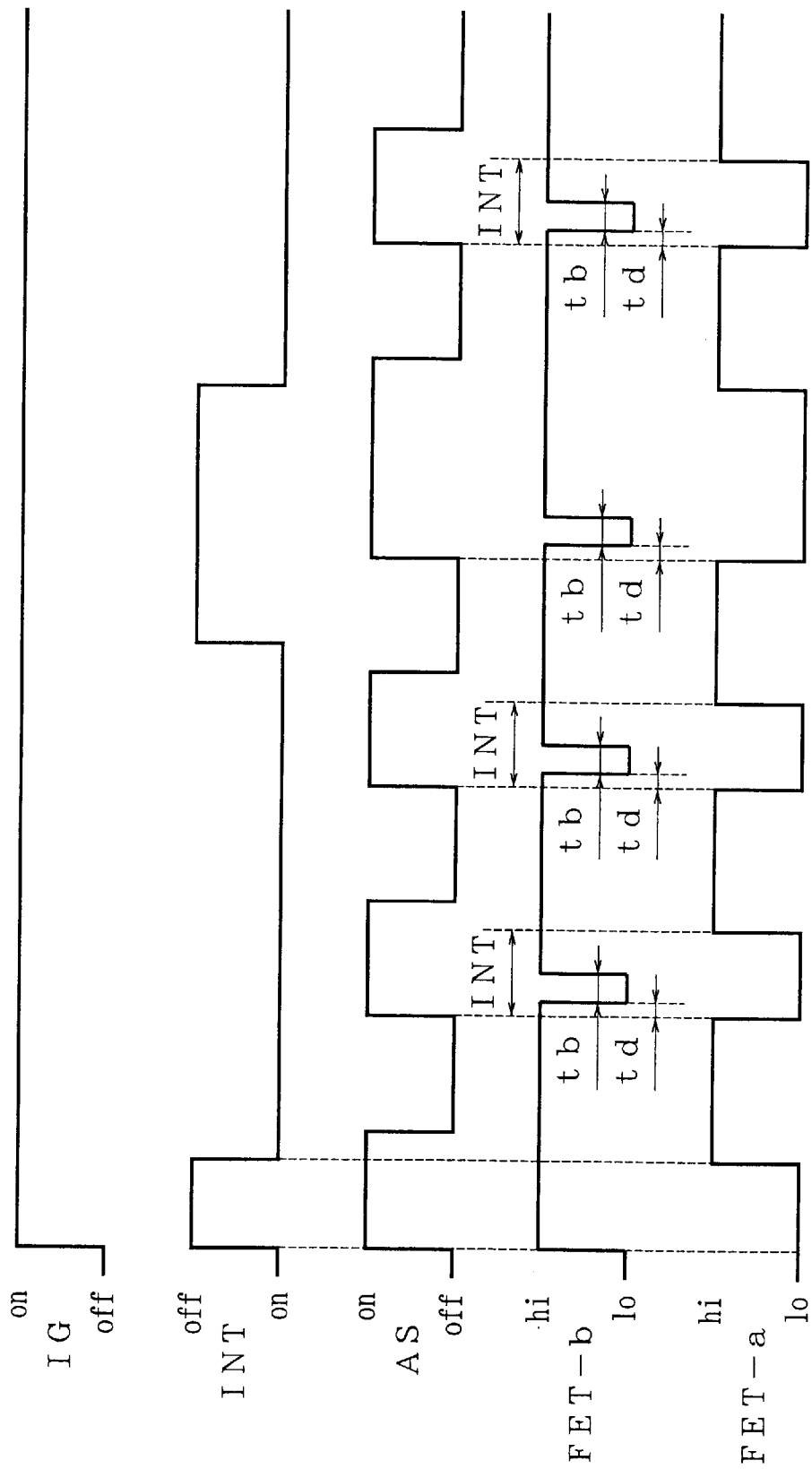
FIG. 7 is a timing chart of signals at respective points of the controller during the INT mode in the wiper control apparatus in FIG. 1.
Figure 8:
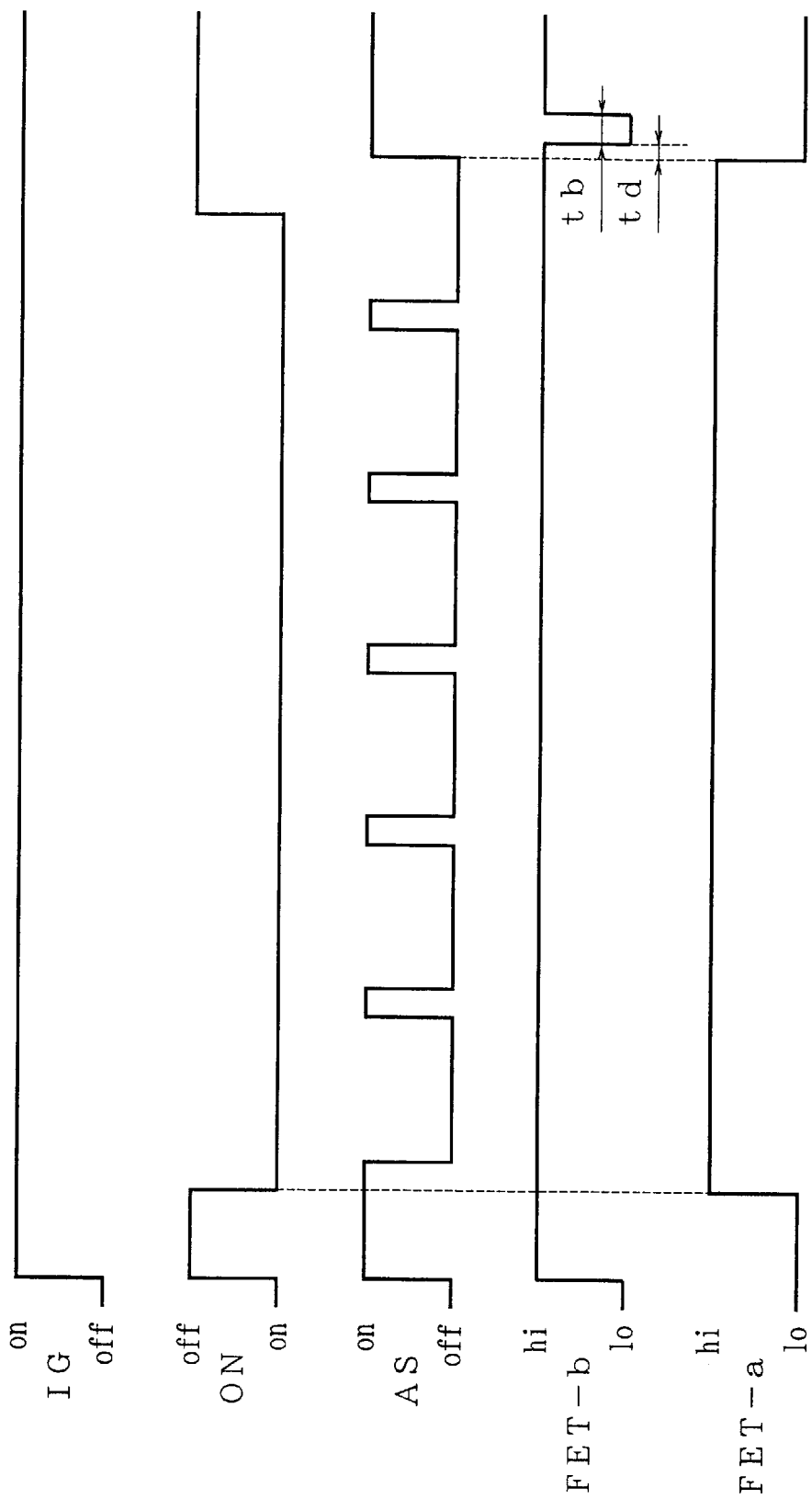
FIG. 8 is a timing chart of signals at respective points of the controller during the ON mode in the wiper control apparatus in FIG. 1.
Figure 9:
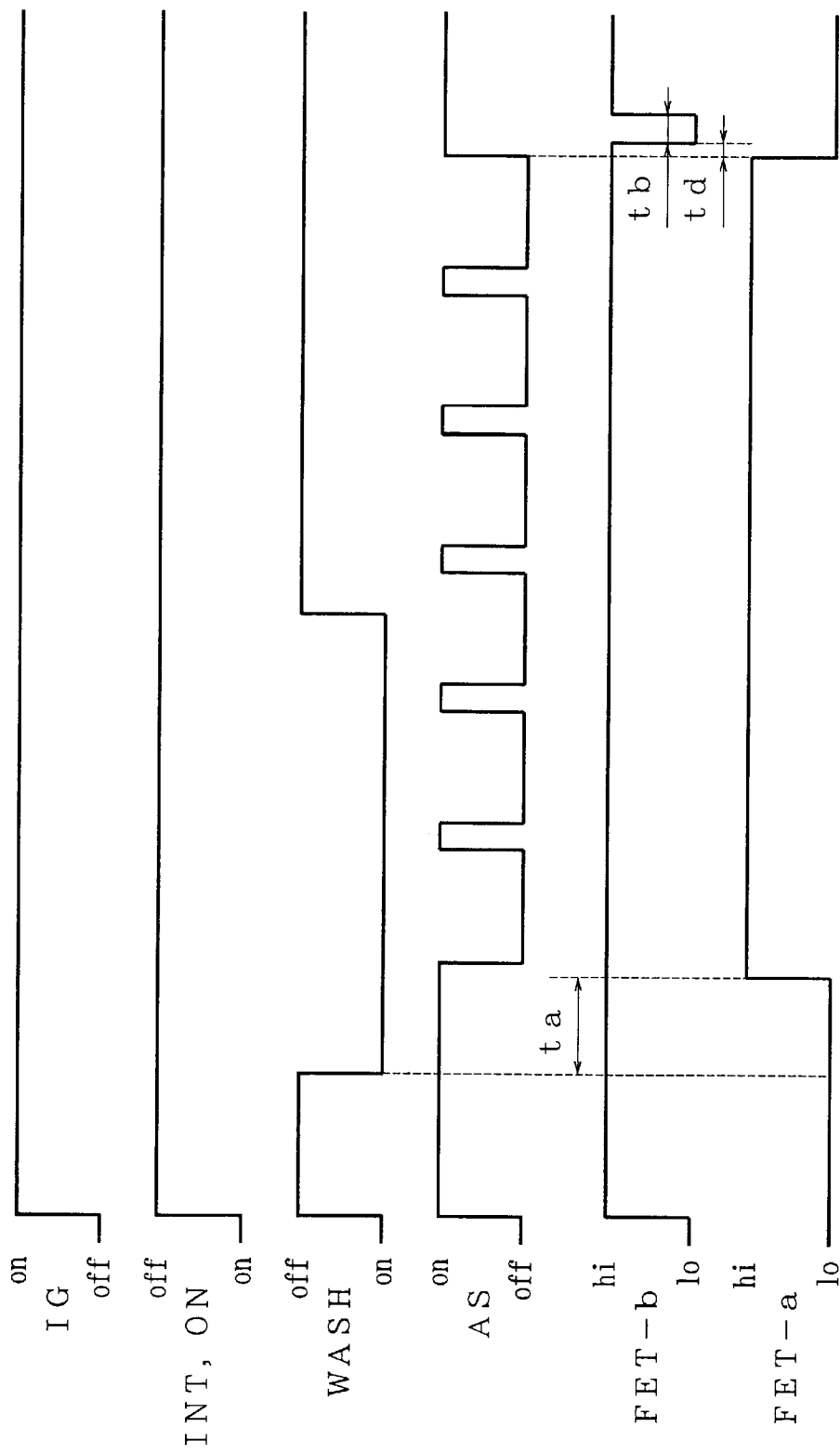
FIG. 9 is a timing chart of signals at respective points of the controller during the WASH mode in the wiper control apparatus in FIG. 1.

The controller 3, under the control by the digital control unit 3A, performs an excellent timing control function during each operation mode on the basis of the timing charts as shown in FIGS. 7–9. The time control function has the characteristic functions listed as follows.

(Function A): function of forwarding the operation to the control units FET-a and FET-b with a time difference tb.

(Function B): function of continuing to produce the control output FET-a until the wiper returns to a park position when the combination switch 2 is turned off on the way of the wiper operation, for example.

(Function C): function of precisely defining the after-wash wiping after the wash operation by the number of times thereof.

(Function D) function of precisely defining the number of times of after-wash wiping even when the combination switch is changed from ON into OFF during the after-wash wiping after the wash operation.

(Function E): function of converting the resistance of a variable resistor 10 in a digital value to define the intermittent time precisely.

(Function F): function of counting the number of times of overheating interruption of the MOSFET 5 when the abnormality of short-circuiting occurs downstream of the wiper motor, and interrupting/latching the output from the MOS-FET 5.

The details of each function will be explained later.

The MOSFET 4 is an N-channel type MOSFET that is a first semiconductor switching device, and serves as a semiconductor switch element for supplying or interrupting the driving voltage to the wiper motor 7 by means of its ON/OFF. The drain thereof is connected to the wiper motor 7, source thereof is connected to the GNT terminal of the combination switch 2 and ground, and the gate thereof is connected to the control output terminal FET-a of the controller 3.

The MOSFET 5 is a P-channel type MOSFET which is a second switching device, and serves as a semiconductor switch element for performing the braking operation of the wiper motor 7 by means of its ON/OFF. The drain thereof is connected to a fuse 13, the source thereof is connected to the drain of the MOSFET 4 through the Zener diode 6, and the gate thereof is connected to the control output terminal FET-b of the controller 3.

Figure 4:
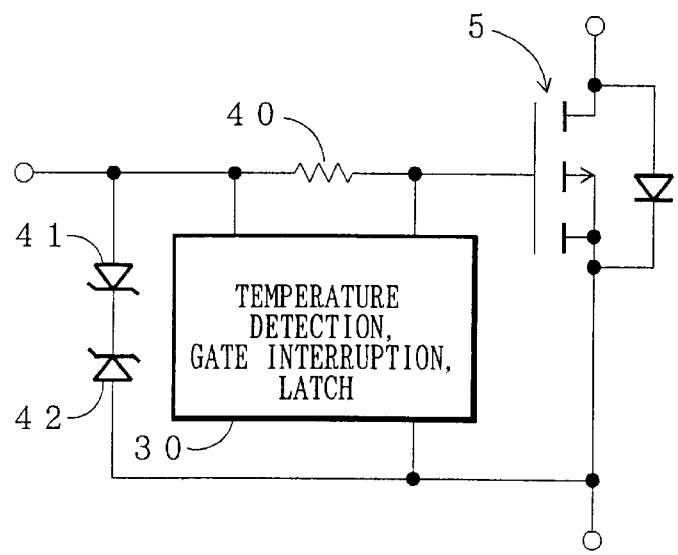
FIG. 4 is a circuit diagram showing an overheating interruption/protection circuit incorporated in the gate circuit of MOSFET in FIG. 1.
Figure 5:
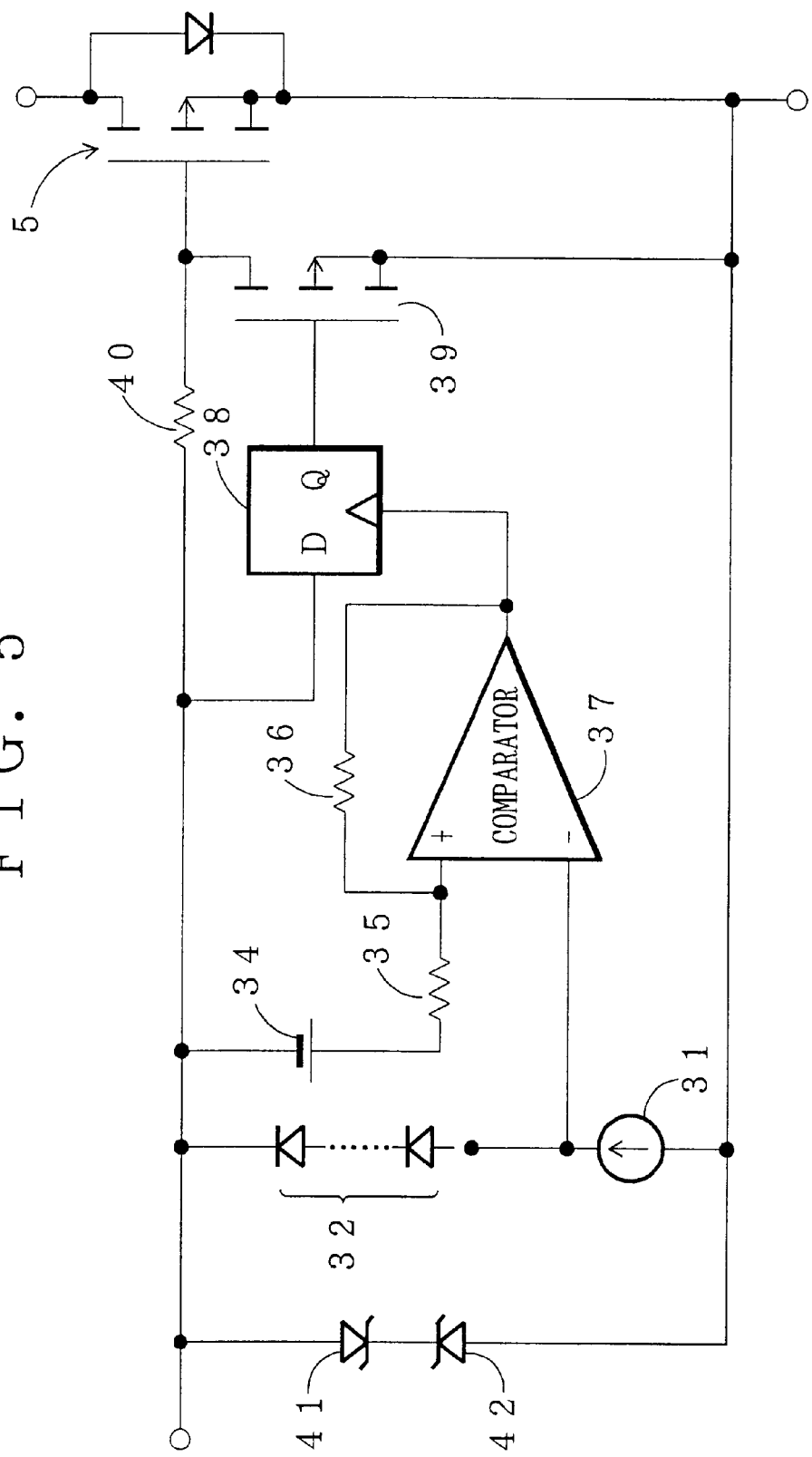
FIG. 5 is a circuit diagram of an actual configuration of an overheating interruption/protection circuit in FIG. 4.

The MOSFET 5 incorporates the overheating interruption/protection circuit 30 shown in FIGS. 4 and 5 in its gate circuit. This overheating interruption/protection circuit 30 includes a temperature detecting circuit, a gate interrupting circuit and a latch circuit.

The Zener diode 6 is selected to have a rating defined so that the Zener voltage satisfies a relationship: a battery voltage (e.g. 13.5 V)<Vz<the rating voltage $V_{DSS}$ of the MOSFET 4. In this way, the Zener diode 6 can have three functions of dissipating the reverse electric motive force of the wiper motor 7 when the MOSFET 4 is overheated and broken, protecting the MOSFET 4 when the battery 11 is connected inversely due to erroneous connection, and surely turning off the MOSFET 5 by shifting the gate potential by 7 V. During the normal operation, only the braking current flows through the Zener diode 6. Therefore, the Zener diode may have a small current of capacity so that it can be miniaturized and made inexpensive. The Zener diode 6 is connected to the source side of the MOAFET 5 in FIG. 5 (where the withstand voltage of the control section is sufficiently high), but may be connected to the drain side. The Zener diodes 6a, 6b, 6c and 6d are provided to protect the gates of the MOSFETs 4 and 5.

The shunt resistor RS1 serves as an overheating interrupting detecting means for detecting the operation of the overheating interruption/protection circuit 30 for the MOSFET 5. The detected output is supplied to the terminal OTD of the controller 3. When the MOSFET 5 is interrupt by the overheating interruption/protection circuit 30, the current from the control output FET-b of the controller 3 increases so that the voltage drop across the overheating interruption detecting resistor R2 increases. The controller 3 detects the interrupted state of the MOSFET 5 with the aid of a change in the voltage drop.

As for the wiper motor 7, its plus terminals is connected to the fuse 13 and the minus terminal is connected to the drain of the MOSFET 4.

As for the AS switch 8, as well known, as the wiper motor 7 rotates, its common contact a is connected to contact b (high level contact) when the wiper is at a park position, or connected to contact c (low level contact) when the wiper is at the other position than the park position.

As for the washer motor 9, its plus terminal is connected to the fuse 13 and the minus terminal is connected to the WASH terminal of the combination switch 2.

The normal operation of the wiper control apparatus according to the present invention having the configuration described above has three operations inclusive of an intermittent wiper operation, a continuous wiper operation and an after-wash wiping operation. The individual operations will be explained below.

In an initial condition, the IG switch 12 is in an "ON" state and the wiper is at a park position. Therefore, the common contact a of the AS switch 8 is connected to the contact b. The control outputs from the controller 3 to the FETs 4 and 5 are "HIGH" at FET-b and "LOW" at FET-a so that both the MOSFETs 5 and MOSFET 4 are "OFF". Specifically, since the MOSFET 4 is an N-channel type, it turns "ON" when the control signal in a high level is supplied to the gate so that a current flows between the drain and source. The MOSFET 4 turns off when the signal in a low level is supplied to the gate. On the other hand, since the MOSFET 5 is of a P-channel type, it turns "ON" when the control signal in a low level is supplied to the gate, and turns off when the control signal in the high level is supplied to the gate. The control signal in the high or low level is set at a level sufficiently higher or lower than an operation threshold value of the pertinent MOSFET.

Intermittent Wiper Operation

Referring to FIG. 1 and FIG. 7 which is a timing chart of signals at respective points of the controller 3 in the INT mode in the wiper control apparatus in FIG. 1, an explanation will be given of the intermittent wiper operation.

When the combination switch 2 is changed into an INT position from the initial state, an INT "ON" signal (low level) is supplied from the combination switch 2 to the controller 3. When the controller 3 receives the INT "ON" signal, it changes the control output FET-a from a low level to a high level immediately at a trailing edge of the INT "ON" signal, thereby controlling the MOSFET 4 to be "OFF".

When the MOSFET 4 turns on, a current flows along the passage of battery 11→IG switch 12→fuse 13→wiper motor 7→MOSFET 4→ground, the wiper motor 7 starts to rotate. In this case, the AS switch 8, which is synchronous with the rotation of the wiper motor 7, is changed from the high level contact b into the low level contact c so that the AS input to the controller 3 is changed from the high level into the low level. When the wiper reciprocates once on a windshield glass as a result that the wiper motor 7 has continued to rotate, the wiper returns to the park position. Then, the AS switch 8 returns from the low level contact c to the high level contact b and the high level signal is supplied to the AS input of the controller 3.

When the high level signal is supplied to the AS input of the controller 3 again, the controller 3 changes the control output FET-a from the high level into the low level, thereby controlling the MOSFET 4 to be "OFF". Subsequently, after dead time td elapses, the controller 3 changes the control output FET-b from the low level to the high level, thereby controlling the MOSFET 5 to be "ON".

As the function A of the controller 3, the dead time td is set for the purpose of preventing the MOSFET 5 and 4 from becoming "ON" and a tunneling current from flowing. The dead time may be set at a time sufficiently longer than the response time of an MOSFET.

The wiper motor 7, the energization of which is stopped by OFF of the MOSFET 4, generates a reverse electromotive force. However, since the MOSFET 5 turns on, a closed loop is formed consisting of the plus terminal of the wiper motor 7→Zener diode 6→MOSFET 5→minus terminal of the wiper motor. Therefore, a reverse current (braking current) flows abruptly through the wiper motor 7 to consume the reverse electric motive force. As a result, the wipermotor 7 is braked and stops abruptly, and hence the wiper stops without exceeding from the park position.

The MOSFET 5 is adapted so that only the braking current when the wiper motor 7 is stopped flows. Since the braking current flows for a short time of several tens of mili seconds, the $R_{DSON}$ rating of the MOSFET 5 is set at a large value of 2-20 times as large as that of the MOSFET 5. For this reason, the MOSFET 5 is further down-sized and made inexpensive.

The controller 3 places the control output FET-b at the low level only during a prescribed period tb necessary to cause the braking current to flow so that the MOS-FET 5 is maintained at the ON state. After a prescribed time tb elapses, the controller 3 returns the control output FET-b from the low level to the high level, thereby controlling the MOSFET 5 to be "OFF". The controller 3, after it has turned off the MOSFET 5, counts the INT time (time while the wiper stops) set by the variable resistor 10, and controls the MOSFET 4 from OFF to ON again. Thereafter, the controller 3 repeats the above operation. In this way, the intermittent wiper operation is performed.

During the intermittent wiper operation, when the combination switch 2 is changed from the INT position to the OFF position, the OFF signal (high level) is supplied to the INT input of the controller 3. In this case, if the wiper remains on the windshield glass and the AS switch 8 is located on the side of the low level contact c, since the AS input of the controller 3 is at the low level, the controller 3 keeps the control outputs FET-a and FET-b at the high level (above function B of the controller 3). Therefore, the MOSFET 4 remains ON and the MOSFET 5 remains OFF so that the wiper motor 7 continues to rotate.

When the wiper returns to the park position and the AS switch 8 is switched into the side of the high level contact b as a result that the wiper motor 7 has continued to rotate, the high level signal is supplied to the AS input of the controller 3. Then, the controller 3 immediately changes the control output FET-a from the high level to the low level, thereby turning off the MOSFET 4. After the dead time td has elapsed, the controller 3 changes the control output FET-b from the high level to the low level, thereby turning on the MOSFET 5. Thus, the wiper motor 7 ceases to rotate.

When the combination switch 2 is changed from the INT position to the OFF position, if the AS switch 8 is located on the side of the high level contact b (and hence the wiper is at the park position), the control signal at the low level from the controller 3 is immediately supplied to the MOSFET 4 and MOSFET 5. As a result, the MOFET 5 becomes ON and MOSFET 4 becomes OFF so that the wiper motor 7 immediately stops.

In this way, when the combination switch 2 is changed into the OFF position, at any position of the wiper, as long as the IG switch 12 is ON, the wiper necessarily stop sat the park position. The AS switch 8 is only employed to detect the park position of the wiper and no driving current for the wiper motor 7 flows through the AS switch 8. Therefore, the AS switch can employ a contact of a small-current capacity type, and may be down-sized and inexpensive. In this case, reliability of its contact can be improved.

The intermittent (INT) time during the intermittent wiper operation can be set by the variable resistor 10 connected to the VR terminal of the combination switch 2. The resistance of the variable resistor 10 is converted into a digital value by a VR converter circuit 3G of the controller 3, whose configuration is shown in FIG. 12, and the converted digital value is sent to the digital control unit 3A. Thus, the intermittent (INT) time can be defined in a precise digital manner (function E of the controller 3).

Continuous Wiper Operation

Referring to the block diagram of FIG. 1 and the timing chart of signals at respective points of the controller 3 during this operation mode (ON mode) as shown in FIG. 8, an explanation ID will be given of the continuous wiper operation.

When the combination switch 2 is changed into the ON position from the initial state, the ON signal (low level) is supplied from the combination switch 2 to the ON input of the controller 3. Then, the controller 3 controls the MOSFET 5 so that it is changed from the low level to the high level, and controls the MOSFET 4 so that it is maintained at the high level. Thus, the MOSFET 5 is controlled to remain "OFF" whereas the MOSFET 4 is controlled so that it is changed from "OFF" to "ON".

When the MOSFET 4 turns on, the wiper motor 7 starts to rotate. Then, since the AS switch 8, which is synchronous with the rotation of the wiper motor 7, is changed from the side of the high level contact b into the side of the low level contact c, the AS input to the controller 3 is changed into the low level. The wiper passes the park position whenever it reciprocates once on the windshield glass. At this time, the AS switch 8 temporarily returns to the high level contact b, and hence the high level signal is supplied to the AS input of the controller 3. However, the controller 3 continues to supply the control signal at the high level from the control outputs FET-a and FET-b to the gates of the MOSFETs 4 and 5. Therefore, the wiper motor 7 continues to rotate.

When the combination switch is changed from the ON position into the OFF position, the OFF signal (high level) is supplied to the ON input terminal of the controller 3. At this time, if the wiper remains on the windshield glass and the AS switch 8 is located on the side of the low level contact c, the controller 3 keeps the control signal output to the MOSFETs 4 and 5 at the high level. Therefore, the wiper motor 7 continues to rotate and the wiper returns to the park position. Then, since the high level signal is supplied to the controller 3, the controller 3 changes the control output FET-a from the high level to the low level so that the MOSFET 4 is immediately turned off and after elapse of the dead time td, the MOSFET 5 is "ON" during the prescribed time tb. Thus, the rotation of the wiper motor is stopped. The braking operation will be carried out in the manner described above.

After-wash wiping operation

Referring to the block diagram of FIG. 1 and the timing chart of signals at respective points of the controller 3 in the WASH mode shown in FIG. 8, an explanation will be given of the after-wash wiping operation.

When the combination switch 2 is changed from the OFF position into the WASH position, a current flows on the battery 11→IG switch 12→fuse 13→washer motor 9→WASH terminal of the combination switch 2→GND terminal→ground. As a result, the washer motor 9 starts to rotate. The washer motor 8 operates a pump (not shown) so that a washing liquid is sent from a washing liquid tank (not shown) onto the windshield glass.

At this time, at the same time as energization of the washer motor 9, the ON signal (low level) is supplied to the WS input of the controller 3. When a delay time ta elapses from the trailing edge of the ON signal, the controller 3 changes the control output FET-a from the high level to the low level, thereby turning on the MOSFET 4. When the MOSFET 4 is turned on, the wiper motor 7 starts to rotate. The wiper makes a reciprocating movement on the windshield glass to wash the windshield glass by the washing liquid. During the period while the combination switch 2 is at the WASH position, the controller 3 continues to supply the high level control signal to the MOSFETs 4 and 5. The delay time ta is set assuming the time taken from when the washer motor 9 starts to rotate to when the washing liquid reaches the windshield glass.

When the combination switch 2 is changed from the WASH position to the OFF position, the OFF signal is supplied to the WS input terminal of the controller 3. After the OFF signal has been supplied to the WS input terminal, the controller 3 continues to supply the high level control signal to the MOSFETs 4 and 5 during a prescribed after-wash wiping time Ta, and thereafter changes the control output FET-a from the high level to the low level so that the MOSFET 4 is turned off to stop the wiper at the park position.

Therefore, in the after-wash wiping operation, the combination switch 2 is set at the WASH position to perform the washer operation. When the combination switch 2 is set at the OFF position to stop the washer operation,the wiping is performed a prescribed number of times (function C of the controller 3).

On the other hand, where the combination switch 2 is changed from the WASH position to the ON position, the controller 3 continues the wiper operation. Where the combination switch 2 is changed from the WASH position to the ON position and further to the OFF position, if the prescribed after-wiping time does not elapse, the controller 3 controls the wiper to perform the after-wiping during the remaining time and thereafter stop at the park position (function D of the controller 3). In this embodiment, after the after-wiping time has been set in terms of time, it can be set in terms of the number of times.

In the above various kinds of operation modes, the wiper control apparatus according to the invention performs the protection operation when abnormality of the wiring short-circuited to the chassis (ground) has occurred downstream of the wiper motor 7 (function F in the controller 3).

Example of Protection Operation

Referring to the block diagram of the wiper control apparatus shown in FIG. 1, the circuit diagram of the overheating interruption/protection circuit shown in FIG. 3, the circuit diagram of the overheating interruption detecting/latching circuit shown in FIGS. 4 and 5, an explanation will be given of a protection operation by the controller 3. The following example describes the protection operation when the abnormality of short-circuiting has occurred while the wiper stops (the combination switch 2 is at the OFF position).

While the wiper stops (the combination switch 2 is at the OFF position), in the circuit diagram of FIG. 3, the ON signal is at the high level, the Q (bar) of the D flip-flop 75 is at the high level, and the output from the AND gate 76 is also at the high level.

Figure 10:
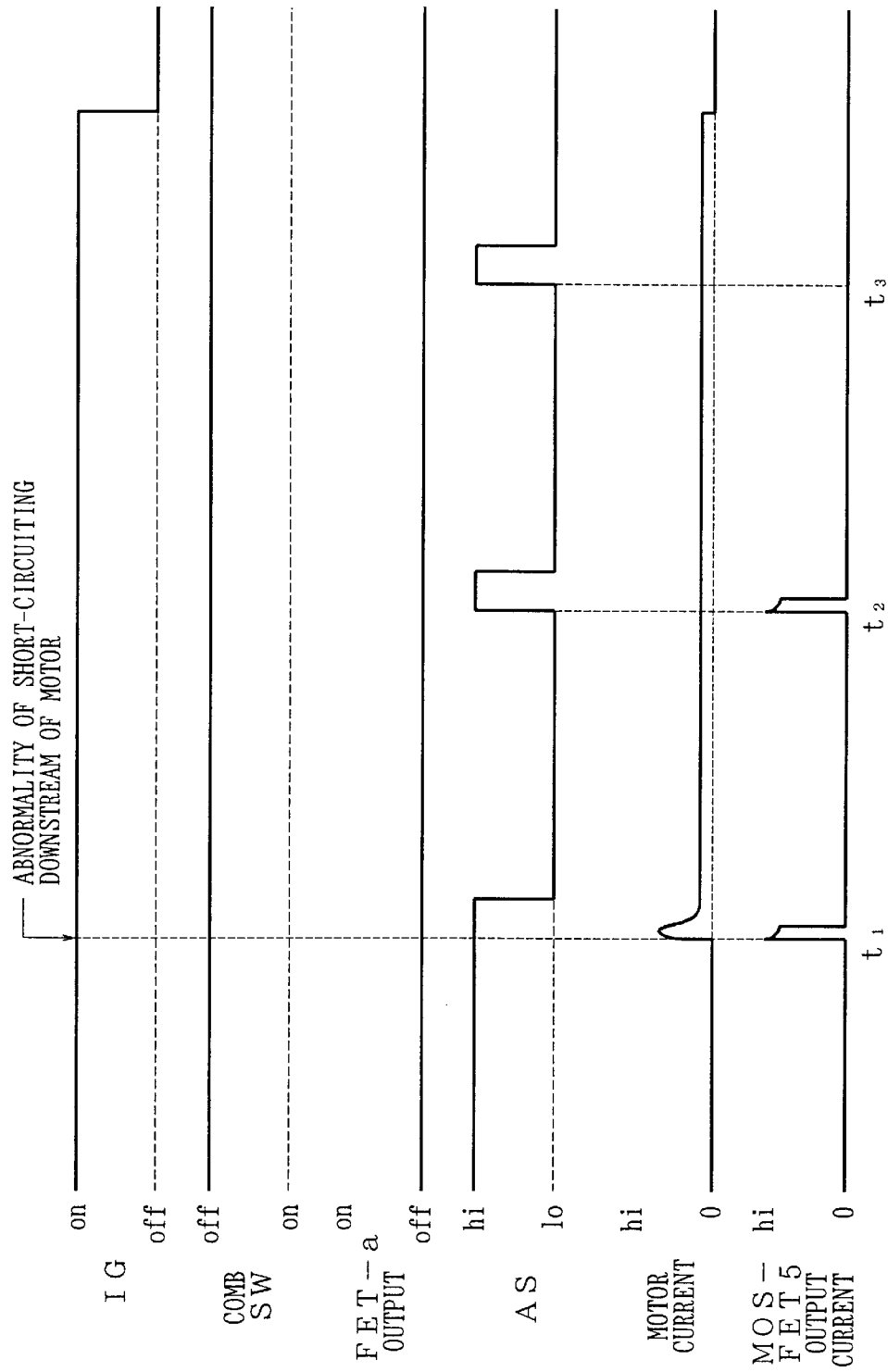
FIG. 10 is a timing chart of signals at respective points of the wiper control apparatus for explaining the protection operation in the wiper control apparatus in FIG. 1.

Now, it is assumed that the wiring downstream of the wiper motor 7 has been just short-circuited to the chassis (ground) at timing t1 in the timing chart of FIG. 10. Then, a current flows to ground via the battery 11→IG switch 12→fuse 13 →wiper motor 7→short-circuiting point so that the wiper motor 7 rotates. As the wiper motor 7 rotates, the common contact a of the AS switch 8 is changed from the high level contact b to the low level contact c so that the AS input of the controller 3 is changed into the low level. When the wiper makes a round trip once, the AS input of the controller 3 is restored to the high level again. As long as the short-circuiting continues, the AS input of the controller 3 alternately repeats the high and low levels.

On the other hand, as seen from the above description, the controller 3 has a function of driving the MOSFETs 4 and 5 so that the wiper returns to the park position even when the combination switch 2 is OFF. Therefore, when the wiper motor rotates once and the AS switch 8 is changed from the low level into the high level, in order to brake the wiper motor, the MOSFET 5 is turned on. At this time, a short-circuiting current flows along the passage of battery 11→IG switch 12→fuse 13→MOSFET 5→Zener diode 6→4 short-circuiting point.

The MOSFET 5 generates heat owing to the short-circuiting current. However, the overheating interruption/protection circuit incorporated in the gate circuit and shown in FIGS. 4 and 5 operates so that the MOSFET is turned off before its chip is broken.

The overheating interruption protecting circuit 30 includes a temperature detecting circuit for detecting the chip temperature of the MOSFET 5. More specifically, in the overheating interruption/protection circuit 30, as seen from FIG. 5, the temperature detecting circuit comprises a current source 31, a temperature detecting portion 32, a reference voltage source 34, a resistor 35 and a comparator 37. The temperature detecting portion 32 is connected to the gate of the MOSFET 5 to which a control signal is supplied from the control output FET-b of the controller 3 through a resistor 40. The temperature detecting portion 32 comprises a plurality of diodes connected in series for detecting heat dissipation of the MOSFET 5. The connecting point of the current source 31 and the temperature detecting portion 32 is connected to the minus input terminal of the comparator 37. A reference voltage source 34 is connected to the plus terminal of the comparator 37 through the resistor 35. In operation, the comparator 37 compares the voltage at the connecting point supplied to the minus terminal and the reference voltage from the reference voltage source 34 supplied to the plus terminal to produce a comparison result as a temperature detected output.

The clock input terminal of a D-type FF (flip-flop) serving as the latch circuit is supplied with the temperature detected output from the temperature detecting circuit. The D input terminal of the D-type FF is supplied with the control signal from the control output FET-a of the controller 3. The output from the Q output terminal of the D-type FF is supplied to an N-channel MOSFET 39 which is connected between the source and gate of the MOSFET 4 and serves as the gate interruption circuit. Zener diodes 41 and 42 which are reverse-connected constitute an excessive voltage protection means for preventing an excessive voltage from being applied to the MOSFET 5. Incidentally, the D-type FF 38 can be omitted. In this case, the temperature-detected output from the temperature detecting circuit causes the P-channel MOSFET 39 serving as the gate interrupting circuit to perform the interruption operation directly.

When a short-circuiting current flows through the MOSFET 5 owing to the abnormality of short-circuiting downstream of the wiper motor 7, the heat generated in the MOSFET 5 is detected by the temperature detecting portion 32. If the voltage detected by the temperature detecting portion 32 falls from the reference voltage from the reference voltage source 34, the high level output which is a comparison result by the comparator 37 is supplied to the clock input terminal of the D-type FF 38. Thence, the low level output from the Q output of the D-type 38 is applied to the gate of the MOSFET 39 so that the MOSFET 39 turns on. When the MOSFET 39 turns on, the gate potential of the MOSFET 4 becomes the low level so that the MOSFET 5 turns off. Thus, the energization of the wiper motor 7 is interrupted.

The control output FET-b of the controller 3 in a pulse form is supplied to the MOSFET 5 so that the interruption latch of the overheating interruption/protection circuit 30 is released. Thereafter, when the AS signal is changed from the low level to the high level at timing t2 at the second rotation of the wiper motor 7, the control output FET-b at the low level is produced again so that the MOSFET 5 turns on. The short-circuiting current is passed through the MOSFET 5 so that the overheating interruption/protection circuit 30 operates to interrupt the MOSFET 5.

Such an overheating interruption/protection operation is added up by the counter 76 of the controller 3 on the basis of the voltage drop across the overheating interruption detecting resistor R2 as understood from the overheating interruption detecting/latching circuit in FIG. 3. When the interruption operation is counted at a prescribed number of times (twice or more), e.g. twice is counted, the MOSFET 5 is interrupted and latched.

Specifically, when the current detecting circuit 3J is supplied with the voltage drop across the overheating interruption detecting resistor R2 from the input terminal OTD, it is amplified by the operational amplifier 71. When the amplified output exceeds a threshold value prescribed by the reference voltage source 72, a high level output is supplied from the comparator 73 to the one input of the AND gate 74. On the other hand, the high level output from the timer 75 triggered by the rise of the AS signal from the low level to the high level is supplied to the other input for a prescribed period. Then, an output at the high level is supplied to the counter 76. The counter 76 adds up the number of times of reception of the high level output. When the counter 76 counts the reception at a prescribed number of times, e.g. twice, the output at the high level is supplied to a clock input terminal of the D type FF. The Q (bar) of the D-type FF 77 is latched at the high level. The output at the high level from the AND gate 78 is supplied to the FET-b terminal of the controller 3 through the amplifier 78 so that the MOSFET 5 is interrupted and latched.

Therefore, after the latching, even when the AS signal is converted from the low level to the high level, the MOSFET 5 remains OFF so that the control section 1 is protected from the abnormality of short-circuiting.

The restoration from the latching is carried out by resetting of the control unit 1, opening of the terminal of the battery 11, inputting of a reset input from the resetting circuit 3c, etc.

The threshold value of the current may have hysteresis. A resting time may be given between when the threshold value of the current exceeds the threshold value to turn off the MOSFET 5 and when the current falls to turn off the MOSFET 5 again.

The similar protection operation is carried out also when abnormality of short-circuiting occurs downstream of the motor and the combination switch 2 is turned off. Further, when the abnormality of short-circuiting occurs during the intermittent operation, the load current is prevented from continuing to flow.

The configuration and operation of the wiper control apparatus according to the present invention provides the following advantages.

(1) Since the RDSON rating of the MOSFET 5 is set at a large value which is 2–20 times as large as that of the MOSFET 4, the MOSFET 5 can be down-sized and made inexpensive.

(2) Since only the braking current flows through the Zener diode 6 for current blocking when the battery is reverse-connected and through the MOSFET 5, the current capacity of the Zener diode 6 can be made small. Therefore, the Zener diode can be made down-sized and inexpensive.

(3) Since the control outputs FET-a and FET-b of the controller 3 are supplied to the MOSFETs 4 and 5 with a time difference td between their times of falling, no tunneling current flows and unnecessary heat and noise dissipation is removed.

(4) When the combination switch 2 is turned off on the way of the wiper operation, the controller 3 continues to issue the control output FET-a until the wiper returns to the park position in such a manner that the signal current is caused to flow through the AS switch 8 of the wiper motor switch 7. For this reason, the AS switch 8, MOSFET 5 and Zener diode 6 can be down-sized and made reliable.

(5) Since the wiping after the washing has been made is defined accurately, an error therefor can be removed.

(6) When the combination switch 2 is changed from the ON position to the OFF position during the wiping after the washing, since the number of times of wiping is defined accurately, an error therefor can be removed.

(7) When the abnormality of the wiper motor 7 occurs, energization of the wiper motor 7 is interrupted. After the abnormality is removed, the energization is restored. For this reason, excessive up-sizing of the MOSFET can be avoided. Namely, the MOSFET can be down-sized and made inexpensive. In addition, the reliability of the wiper control apparatus inclusive of the driving circuit and motor can be improved.

(8) The resistance of the variable resistor is converted into a digital value to define the intermittent time accurately. This improves the timing accuracy of the intermittent wiper operation.

(9) When the VR terminal of the combination switch 2 is released, the intermittent time is accurately defined at a prescribed time by the controller 3. This improves the timing accuracy of the intermittent operation.

(10) When the abnormality of short-circuiting occurs downstream of the wiper motor 7, by surely interrupting the braking circuit by the MOSFET 5, the safety of the wiper control apparatus is improved. By reducing the generated heat during the normal operation and the abnormal short-circuiting, the wiper control apparatus can be downsized.

Although several embodiments were explained, the present invention should not be limited to them, but can be realized in several modifications and applications.

For example, in the above embodiment, the interruption/latching is not made at the time of the first overheating interruption operation in order to avoid the interruption latching by the instantaneous short-circuiting by an artificial mistake. However, the interruption latching may be made at the first overheating interruption in order to improve reliability.

Figure 6:
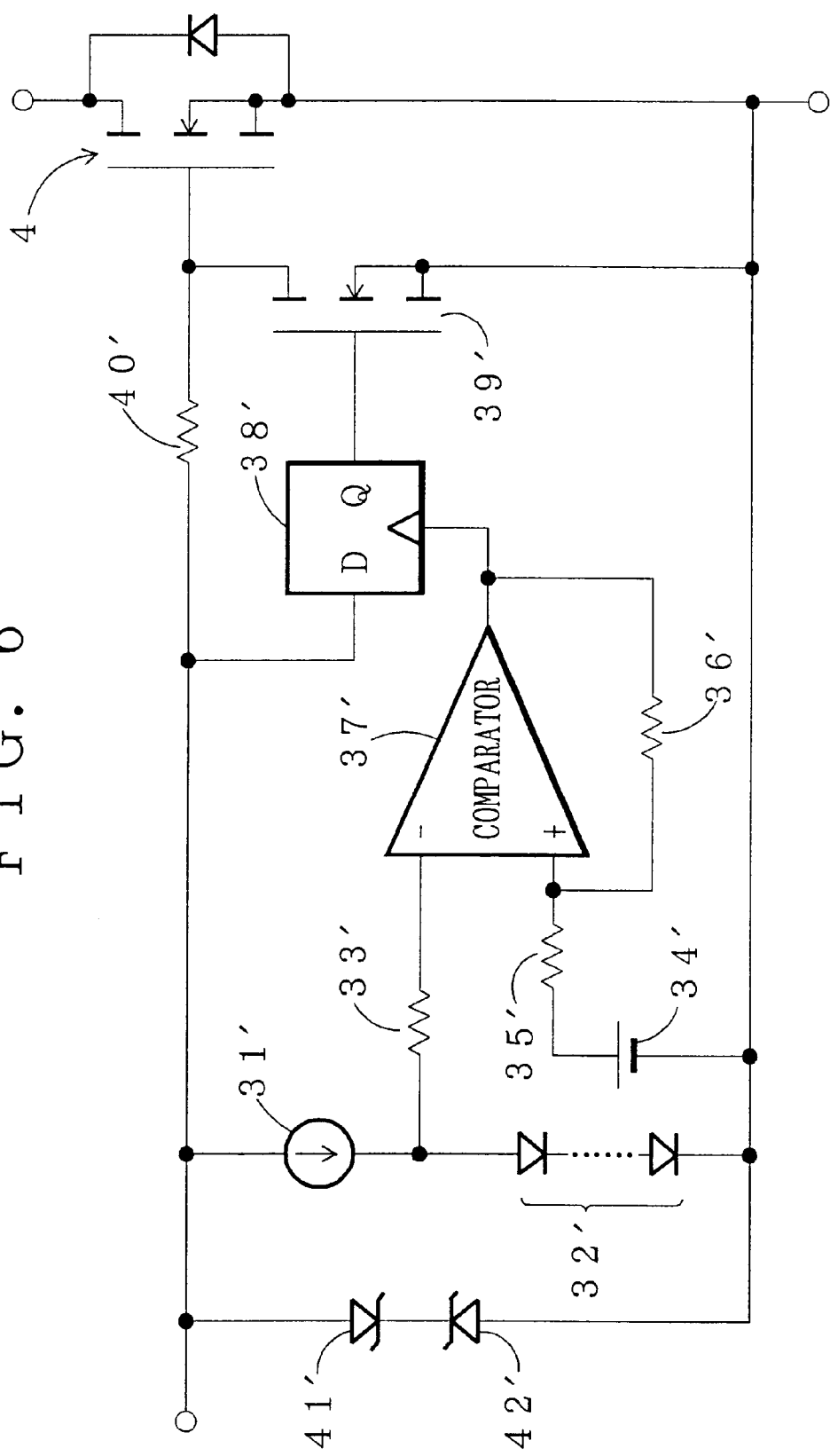
FIG. 6 is a circuit diagram of another embodiment according to this invention.

In another embodiment of the wiper control apparatus according to the present invention, as shown in FIG. 6, a gate circuit for the N-channel MOSFET 4, which serves as a semiconductor switch for supplying or interrupting the driving voltage applied to the wiper motor 7, is provided with an overheating interruption/protection circuit 30'. The overheating interruption/protecting circuit 30' includes a temperature detecting circuit, a gate interruption circuit and a latch circuit.

More specifically, in the overheating interruption/protection circuit 30', as seen from FIG. 6, the temperature detecting circuit comprises a current source 31', a temperature detecting portion 32', a resistor 33', a reference voltage source 34', a resistor 35' and a comparator 37'. The current source 31' is connected to the gate of the MOSFET 4 to which the control signal is supplied from the control output FET-a of the controller 3 through a resistor 40'. The temperature detecting portion 32 comprises a plurality of diodes connected in series for detecting heat dissipation of the MOSFET 4. The connecting point of the current source 31 and the temperature detecting portion 32 is connected to the minus input terminal of the comparator 37 through the resistor 33. A reference voltage source 34 is connected to the comparator 37 through the resistor 35. In operation, the comparator 37 compares the voltage at the connecting point supplied to the minus terminal and the reference voltage from the reference voltage source 34 supplied to the plus terminal to produce a comparison result as a temperature detected output.

The clock input terminal of a D-type FF (flip-flop) 38' serving as the latch circuit is supplied with the temperature detected output from the temperature detecting circuit. The D input terminal of the D-type FF 38' is supplied with the control signal from the control output FET-a of the controller 3. The output from the Q output terminal of the D-type FF 38' is supplied to an N-channel MOSFET 39' which is connected between the source and gate of the MOSFET 4 and serves as the gate interruption circuit. Zener diodes 41' and 42' which are reverse-connected constitute an excessive voltage protection means for preventing an excessive voltage from being applied to the MOSFET 4. Incidentally, the D-type FF 38' can be omitted in this case, the temperature-detected output from the temperature detecting circuit causes the N-channel MOSFET 39 serving as the gate interrupting circuit to perform the interruption operation directly.

When the wiper motor produces the abnormality such as locking or short while it is energized, a large current flows through the MOSFET 4. In this case, a voltage based on the heat dissipation of the MOSFET 4 is detected by the temperature detecting portion 32'. If the voltage detected by the temperature detecting portion 32' exceeds the reference voltage from the reference voltage source 32', the high level output which is a comparison result by the comparator 37' is supplied to the clock input terminal of the D-type FF 38'. Thence, the high level output from the Q output of the D-type FF 38' is applied to the gate of the MOSFET 39' so that the MOSFET 39' turns on. When the MOSFET 39' turns on, the gate potential of the MOSFET 4 becomes the low level so that the MOSFET 4 turns off. Thus, the energization of the wiper motor 7 is interrupted.

Through each of the protection operations described above, the abnormal current ceases to flow through the wiper motor so that the reliability of the motor, wire and connector can be improved. The various kinds of protection operations may be combined as occasion demands.

As a further embodiment of the wiper control apparatus according to the present invention, as shown in FIG. 10, the present invention can be applied to a wiper control apparatus in which a two-speed wiper motor is driven. The two-speed wiper motor is commonly employed for a wiper for the front glass of a vehicle.

Figure 11:
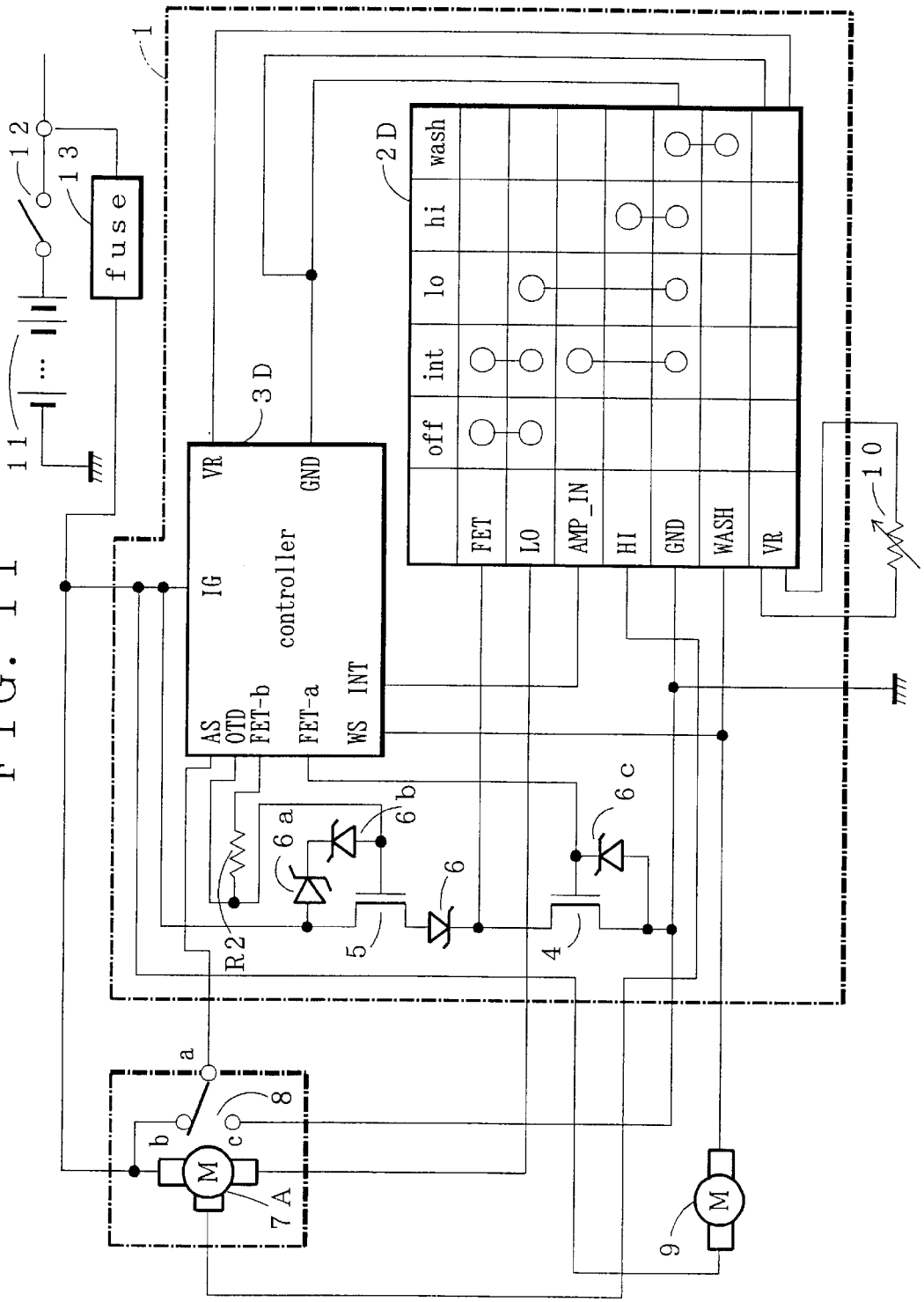
FIG. 11 is a block diagram showing another embodiment of the wiper control apparatus according to the present invention, i.e. a two-speed wiper motor control apparatus.

As seen from FIG. 11, the wiper control apparatus according to this embodiment comprises a combination switch 2D, a controller 3D, MOSFETs 4, 5, a Zener diode 6, a two-speed wiper motor 7A, a washer motor 9, a variable resistor 10 and a shunt resistor RS1.

The combination switch 2D includes an FET terminal connected to the drain of the MOSFET 4 and source of the MOSFET 5, an LO terminal connected to the low speed terminal of the wiper motor 7A, an AMP-IN terminal connected to the INT2 terminal of the controller 3B, an HI terminal connected to the high speed terminal of the wiper motor 7A, a GND terminal connected to ground and a WASH terminal connected to the washer motor.

The controller 3D has an arrangement-in which the ON input is omitted from the arrangement of the controller of FIG. 1.

In the configuration shown in FIG. 11, during the intermittent operation, the wipermotor 7A is driven by the MOSFET 4 at the same timings as shown in FIG. 7. The low speed continuous rotation and high speed continuous rotation are directly on/off controlled by the LO terminal and HI terminal of the combination switch 2D. During the low speed continuous rotation (LO) and the high speed continuous rotation (HI), the MOSFET 4 is separated from the wiper motor 7A by the FET terminal of the combination switch 2D. When the IG switch 12 is turned on with the wiper remaining on the windshield glass, even with the combination switch 2D being at the OFF position, the wiper motor 7A is driven by the MOSFET 4 until the wiper reaches the park position.

In this way, the low speed continuous driving (LO) and the high speed continuous driving (HI) are directly on/off controlled by the LO terminal and HI terminal of the combination switch 2D, the current rating of the MOSFETs 4 and 5 can be made small. Thus, these MOSFETs can be downsized and made inexpensive. Further, during the LO driving and HI driving, since the MOSFETs 4 and 5 are separated from the wiper motor 7, these MOSFETs are not influenced by the electromotive force of the wiper motor coil. This makes it unnecessary to add a protection element.

In a further embodiment, the wiper control apparatus according to the invention can be applied to a control apparatus combined with a relay. Where two systems of wipers are installed in a vehicle, the wiper control apparatus according to the present invention can be adopted in the one system and the relay type wiper control apparatus according the prior art can be adopted in the other system.

In this case, as seen from FIG. 12, the wiper control apparatus according to the present invention and the relay-type wiper control apparatus are combined with each other. The former wiper control apparatus comprises a control section 1 including a combination switch 2, controller 3B, MOSFETs 4, 5, a Zener diode 6 and an overheating interruption detecting resistor R2; a wiper motor 7, an AS switch 8 and a washer motor 9. The relay-type wiper control apparatus comprises a combination switch (inclusive of a variable resistor 10A), a two-speed type wiper motor 7A, an AS switch 8A, a washer motor 9A and a relay 60.

The combination switch 2B includes an AS terminal connected to an AS switch 8A through a relay 60, an LO terminal connected to a low speed terminal of a wiper motor 7A, an AMP-IN terminal connected to the INT terminal of a controller 3B, an HI terminal connected to the high speed terminal of a wiper motor 7A and a GND terminal to ground and WASH terminal connected to the washer motor 9A.

The controller 3B, in addition to the controller 3 shown in FIG. 1, includes an IG 2 terminal connected to a fuse 13A for supplying a power supply voltage to the wiper motor 7A, a RLY terminal connected to a coil of a relay 60, an WS2 terminal connected to the WASH terminal of the combination switch 2B, an INT2 terminal connected to the AMP-IN terminal of the combination switch 2B, an VR2 terminal connected to the VR terminal of the combination switch 2B and a GND terminal. The controller 3B serves-to control both MOSFETs 4, 5 and relay 60.

For example, the wiper motor 7A of the relay-type wiper control apparatus having a conventional arrangement serves to drive a front wiper and the wiper motor 7 of the wiper control apparatus according to the present invention severs to drive a rear wiper.

In this way, the controller 3B includes the collected function of controlling both MOSFETs 4, 5 and relay 60, and hence can be down-sized and made inexpensive. The control is correlated between the front wiper and rear wiper.

Figure 13:
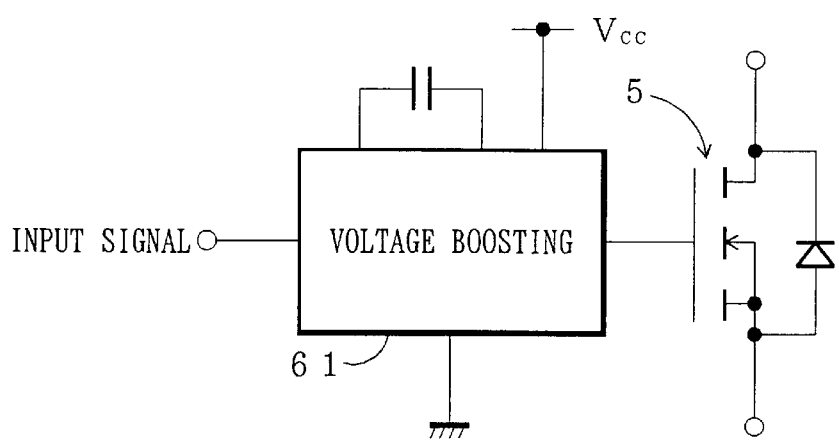
FIG. 13 is a circuit diagram showing a further wiper control apparatus according to the present invention.

In a further embodiment of the wiper control apparatus according to the present invention, the MOSFET 5 for braking the wiper motor may be an N-channel type instead of the P-channel type. In this case, as shown in FIG. 13, the gate of the N-channel type MOSFET 5 must be connected to a voltage multiplying means such as a boot strap circuit, a charge pump circuit, etc. Since the N-channel MOSFET has small ON resistance of about half the P-channel type MOSFET, with the same rating of the ON resistance, it can be down-sized or made inexpensive more largely than the P-channel type.

What is claimed is:

1. A wiper control apparatus comprising:
    a combination switch for setting an operation mode of a wiper;
    a wiper motor which is driven according to the operation mode set by said combination switch;
    an autostop (AS) switch for producing a signal having a level varying according to a park position and other positions as the wiper motor rotates;
    a first semiconductor switch element for controlling the on/off energization of the wiper motor;
    a second semiconductor switch element for turning on a closed circuit for braking said wiper motor which passes a reverse current through said wiper motor while energization for said wiper motor is off;
    a controller for supplying a first ON/OFF control signal to the first semiconductor switch element and a second ON/OFF control signal to said second semiconductor switch element;
    an overheating interruption/protection circuit for interrupting/protecting said second semiconductor element when it is overheated;
    an overheating-interruption detecting means for detecting an overheating interruption/protection operation of said overheating interruption/protection circuit; and
    an overheating-interruption detecting/latching circuit for interrupting said second control signal when the number of times of overheating interruption in said overheating interruption/protection circuit reaches a prescribed number of times according to a detected signal from the said overheating interruption detecting means.

2. A wiper control apparatus according to claim 1, wherein said first semiconductor switch element is an N-channel MOSFET, and said second semiconductor switch element is a P-channel MOSFET.

3. A wiper control apparatus according to claim 2, wherein a Zener diode is connected to said first semiconductor switch element.

4. A wiper control apparatus according to claim 1, wherein said first semiconductor switch element is located downstream of said wiper motor.

5. A wiper control system comprising a wiper control apparatus according to claim 1 and a relay-type wiper control apparatus, wherein said controller controls the operation of both wiper control apparatus and relay-type control apparatus.

* * * * *